Figures 1, 2:
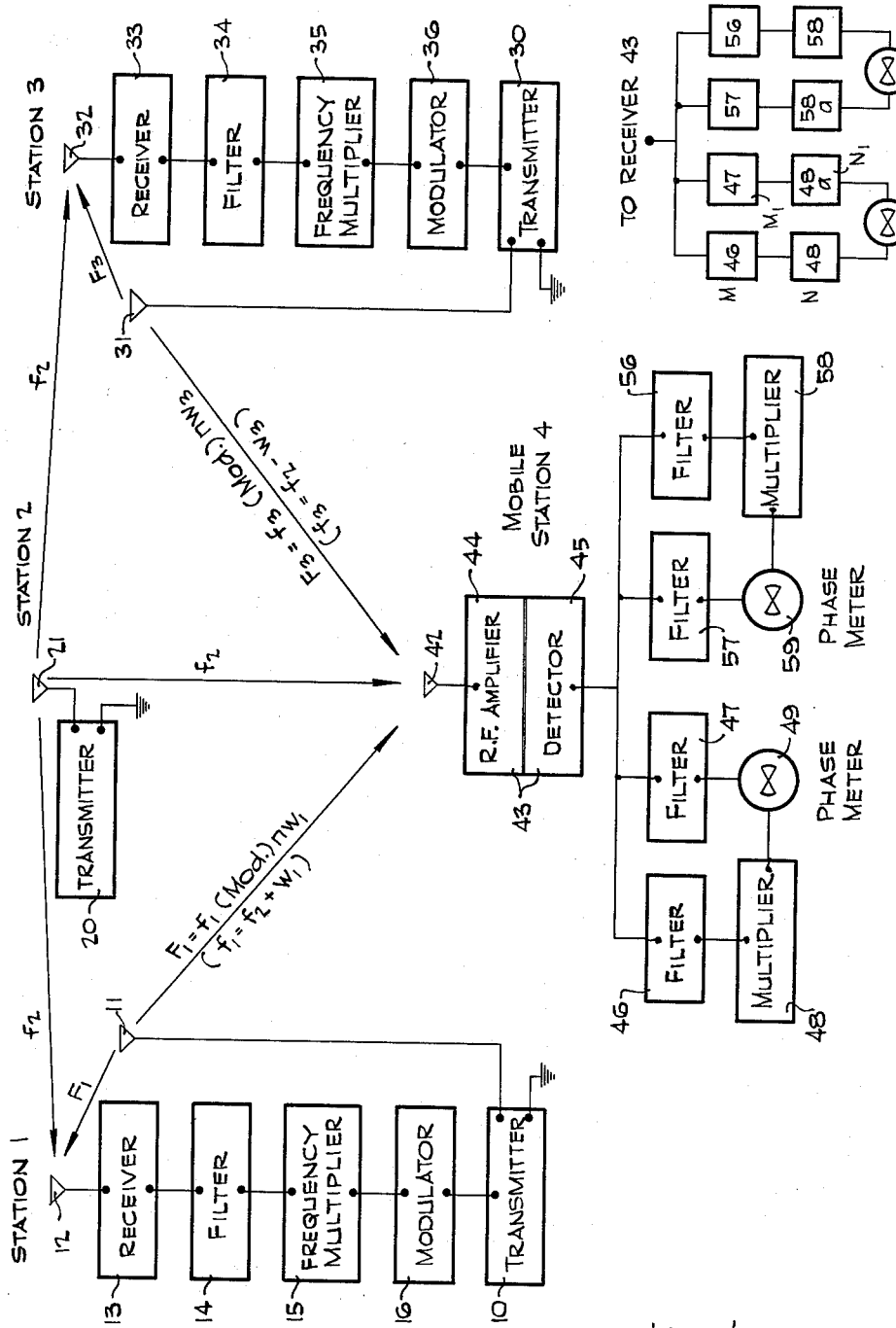

Nov. 15, 1955    S. KAUFMAN    2,724,114
PHASE-COMPARISON RADIOLOCATION SYSTEM
Filed Oct. 16, 1950

Inventor:
Sidney Kaufman
By [signature]
His Attorney

United States Patent Office 2,724,114
Patented Nov. 15, 1955

2,724,114

PHASE-COMPARISON RADIOLOCATION SYSTEM

Sidney Kaufman, West University Place, Tex., assignor to Shell Development Company, Emeryville, Calif., a corporation of Delaware Application October 16, 1950, Serial No. 190,307

5 Claims. (Cl. 343—105)

This invention pertains to methods and apparatus for radiogoniometric point location, and relates more particularly to a self-modulated single-channel phase-comparison radiolocation system capable of accurately determining the location of a point, such for example as that of any instantaneous position of a movable receiving station, with regard to predetermined reference points, such as fixed transmitting stations.

Radiogoniometric location systems have an extensive application in navigation, both on sea and in the air, and in surveying, especially in desert and water covered areas devoid of landmarks. In this connection, their application for purposes of off-shore geophysical exploration may be particularly mentioned.

Radiogoniometric location systems heretofore developed and used are subject to certain limitations with regard to accuracy, range, equipment required, etc. Their main drawback may however, be said to be that of requiring the use of at least two channels, which considerably restricts their usefulness in view of the limited range of carrier bands made available for this purpose by government regulations.

It is therefore an object of this invention to provide a phase-comparison radiolocation method and apparatus whereby the location of a desired point, such as that of a mobile receiving station, can be accurately determined by means of a plurality of signals transmitted thereto from a plurality of fixed stations on a single radio frequency channel.

It is also an object of this invention to provide a phase-comparison radiolocation method and apparatus whereby the location of a mobile station can be accurately determined by transmitting thereto modulated and unmodulated radio-frequency signals differing from each other by an audio frequency, obtaining audio-frequency signals by interference between and by demodulation of said radio-frequency signals, and comparing the phases of selected harmonics of said audio frequency signals.

These and other objects of this invention will be understood from the following description taken with reference to the attached drawings wherein:

Fig. 1 is a schematic diagram of the present system;
Fig. 2 is an equivalent arrangement of a portion of the mobile station shown in Fig. 1.

Referring to Fig. 1, the present single-channel phase-comparison radiolocation system comprises three fixed reference stations generally indicated as 1, 2 and 3, and any desired number of mobile stations at points whose location it is to determine with regard to the reference points. For purposes of simplicity, only one of these stations is shown at 4 in Fig. 1.

The reference stations 1, 2 and 3 are preferably located along an approximately straight line, and are separated from each other by distances which may be as large as desired and are limited only by the power and the sensitivity of the transmitters and receivers used.

The central reference station comprises a transmitter 20 provided with an antenna 21.

The lateral reference station 1 has a transmitter 10 provided with a transmitting antenna 11. Station 1 has also a receiver 13 provided with an antenna 12 and connected in circuit with a filter section or unit 14, a frequency multiplier 15 and a modulator 16, whose output is applied to modulate the transmitter 10. The two antennas may be separated by a distance such as 50 feet.

Similarly, the other lateral station 3 has a receiving antenna 32, receiver 33, filter 34, frequency multiplier 35, modulator 36, and a transmitter 30 with antenna 31.

The mobile station 4, which may be, for example, a vehicle, a plane or a ship, such as a ship doing geophysical exploration work, has a receiving antenna 42 and a receiver 43, whose detector section is of the so-called "square law" type, which does not detect linearly, but squares the input. Receivers 13 and 33 of stations 1 and 3 are also preferably of this type. The receiver 43 is diagrammatically shown as comprising a radio-frequency amplifier section 44 and a detector section 45.

The audio-frequency output of the receiver 43 is connected to audio-filters 46, 47, 56 and 57, frequency multipliers 48 and 58, and phase meters 49 and 59.

The central reference station 2 is adapted to transmit a desired carrier radio frequency $f_2$. Although even relatively low radio frequencies may be used with the present system to increase operational range while retaining the desired high accuracy, the invention will be described with reference to the use of high frequencies of the order from 1 to 5 megacycles, which are technically highly satisfactory for achieving the desired results and whose use may be found permissible under existing government regulations.

The transmitter 10 of station 1 is adapted to transmit a basic carrier frequency $f_1$, which differs from the frequency $f_2$ only by an audio frequency $w_1$ of low order, such for example as 400 cycles, so that $f_1 = f_2 + w_1$.

In a similar manner, the transmitter 30 of station 3 is adapted to transmit a basic carrier frequency $f_3$, which differs from the frequency $f_2$ by another low audio frequency $w_3$, such for example as 250 cycles, so that $f_3 = f_2 - w_3$.

The low order audio frequencies $w_1$ and $w_3$ should preferably be chosen so as not to be harmonically related to each other in a simple ratio, for example, frequencies such as 250 and 400 cycles, 350 and 600 cycles, etc., may be advantageously used.

Each of the receivers 13, 33 and 43 of the system is tuned to the carrier frequency $f_2$, and all three receivers are therefore responsive to all three transmitters 10, 20 and 30, since the three frequencies $f_2$, $f_1 = f_2 + w_1$ and $f_3 = f_2 - w_3$, for example 1,800,000 cycles, 1,800,400 cycles and 1,799,750 cycles, are too close to each other to be separated from each other by the radio-frequency sections of the receivers 13, 33 and 43.

At station 1, the filter unit 14 is designed to pass only the beat or interference frequency between the frequency $f_2$ received from transmitter 20 of station 2 and the frequency $f_1$ from transmitter 10 of station 1, that is, the audio frequency $w_1 = f_1 - f_2$. This audio frequency is supplied to the frequency multiplier unit 15, which multiplies, that is, doubles, triples, etc., said frequency, thus converting it to a frequency which may be designated as $nw_1$, where $n$ is any preferable low integer. The audio frequency $nw_1$ is then fed to the modulator unit 16, which applies it to modulate the basic carrier frequency $f_1$ of transmitter 10. The transmitter 10 thus transmits a complex signal, which may for convenience be considered as comprising the basic radio frequency component $f_1$ and a modulated component wherein said basic frequency $f_1$ is modulated by the audio frequency $nw_1$, which complex signal will be designated hereinbelow as $F_1 = f_1$ (mod.) $nw_1$.

The same operation is performed at station 3, where the filter unit 34 passes a beat frequency $w_3=f_2-f_3$, and the transmitter 30 transmits a complex signal F, having a component $f_3$, and a modulated component $f_3$ (mod.) $nw_3$.

When the whole system is in operation, the following signals are thus being transmitted by its three transmitting stations, only one channel, that of the carrier frequency $f_2$, being require for this purpose:

Station 1 transmits signals $f_1=f_2+w_1$ and $F_1=f_1$ (mod.) $nw_1$.

Station 2 transmits signal $f_2$.

Station 3 transmits signals $f_3=f_2-w_3$ and $F_3=f_3$ (mod.) $nw_3$.

The radio-frequency amplifier 44 of the receiver 43 of the mobile indicator station 4 is responsive to all these signals, and the output of the detector section 45 is a complex audio signal consisting of a group of signals or components of different audio frequencies.

The filter 47 is preferably designed to select only the component (mod.) $nw_1$ due to demodulation of $F_1$ in 45, which is passed to the phase meter 49.

The filter 46 is preferably designed to select only the component $w_1$ due to interference between the radio-frequency signals $f_1$ from station 1 and $f_2$ from station 2. This signal of frequency $w_1$ is passed to frequency multiplier 48, which, for the above-mentioned characteristics of filters 47 and 46, multiplies the frequency of $w_1$ by the factor $n$. The signal of frequency $nw_1$ thus obtained is supplied to the phase meter 49, which compares its phase with that of the signal of frequency (mod.) $nw_1$, supplied to said meter through filter 47, as previously described.

In the same manner the meter 59 may compare the phase of the modulating audio frequency (mod.) $nw_3$ supplied thereto from filter 57, with that of the audio frequency $nw_3$ supplied thereto as a result of selection by filter 56 of the signal of frequency $w_3$ arising from interference between the radio-frequency signals $f_2$ from station 2 and $f_3$ from station 3, and after frequency multiplication in frequency multiplier 58.

With regard to the two audio-frequencies compared by the phase-meter 49, it will be seen from the discussion hereinbelow that the frequency (mod.) $nw_1$, obtained by demodulation, is essentially not phase-related to the position of the mobile station 4 with regard to the location of stations 1 and 2, while the other frequency, namely $nw_1$, obtained from interference between $f_1$ and $f_2$ and subsequent frequency multiplication, is phase-dependent on the position of the mobile unit 4 with regard to the location of stations 1 and 2.

In other words, the instantaneous phase of the interference or beat note between the signal $f_2$ from station 2 and the signal $f_1=f_2+w_1$ from station 1 is a function of the difference in path lengths between the mobile station 4 and the two transmitting stations 1 and 2. When the beat note is multiplied, for example, doubled, tripled, etc. in frequency by the unit 48, the change in phase of the multiplied, i. e. doubled, tripled, etc. beat note becomes a multiple, i. e. two times, three times, etc. of the basic beat note. If the mobile station is moved or displaced in a manner such that the difference in distance between said mobile station 4 and the fixed transmitting stations 1 and 2 changes, then the phase of the multiplied beat note will change.

On the other hand, the phase of the (mod.) $nw_1$ audio frequency signal due to the demodulation of the modulated radio-frequency signal $F_1=f_1$ (mod.) $nw_1$ from station 1 is essentially constant in space, event for large changes in the location of the mobile station 4. This signal can therefore be used as a reference signal to measure the phase changes of the multiplied beat signal caused by changes in location of the mobile station, which is done by comparing the phase of the $nw_1$ and (mod.) $nw_1$ audio frequency signals in the phase meter 49.

It may be shown that in cases wherein the phase indication at a mobile station depends on the difference in distance between said mobile station and two fixed stations, there exist hyperbolic lines of position along which the phase indication is constant. Knowing the line of position through a starting point, and continuously measuring and counting cycles and fraction of a cycle of the multipled beat note while moving from the starting point to a final point, it is possible to determine the hyperbolic line of position of the final point. In order to determine uniquely the position of the final point on the hyperbolic line, however, it is necessary to determine the point of intersection of said line with a second hyperbolic line of position, which is accomplished in the present system by means of the two other audio-frequency signals whose phases are compared by the second phase meter 59 in a manner identical to that already described with regard to meter 49 to give a second hyperbolic line of position for the location of the mobile station 4. This second line of position passing through the location of the mobile station is one of a family of hyperbolas having the locations of stations 2 and 3 as foci, in the same manner as the family of hyperbolas obtained by phase comparison in meter 49 has stations 1 and 2 as foci. The simultaneous measurements effected by meters 49 and 59 are thus sufficient for a positive and accurate determination of the location of the mobile station 4 at any given moment.

For clearness, the above may be recapitulated with regard to an example in which numerical values are assigned to the various frequencies of the system:

Carrier frequency assigned to system: $f_2=1.8$ megacycles=1,800,000 cycles/sec.

*Fixed station 1*

1. Basic frequency: $f_1=f_2+w_1=1,800,400$ C. P. S.
2. Frequency obtained by interference of stations 1 and 2: $f_1-f_2=w_1=400$ C. P. S.
3. Modulating frequency after frequency multiplication ($n=2$): $nw_1=800$ C. P. S.
4. Complex modulated signal from station 1: $F_1=f_1$ (mod.) $nw_1=1,800,400$ cycles (radio frequency of 1,800,400 C. P. S. modulated by an audio frequency of 800 C. P. S.).

*Fixed Station 2*

Basic frequency $f_2=1,800,000$ C. P. S.

*Fixed Station 3*

1. Basic frequency: $f_3=f_2-w_3=1,799,750$ C. P. S.
2. Frequency obtained by interference of stations 2 and 3: $f_2-f_3=w_3=250$ C. P. S.
3. Modulating frequency after frequency multiplication: $nw_3=500$ C. P. S.
4. Complex modulated signal from station 3: $F_3=f_3$ (mod.) $nw_3=1,799,750$ C. P. S. (radio frequency of 1,799,750 C. P. S. modulated by an audio frequency of 500 C. P. S.).

*Mobile station 4*

1. Audio-frequency signal obtained by interference between the frequency $f_2$ from station 2 and frequency $f_1$ from station 1: $w_1=400$ C. P. S. (shifting phase).
2. After frequency multiplication: $nw_1=800$ cycles (shifting phase).
3. Frequency obtained by demodulation of the complex modulated signal $F_1$: (mod.) $nw_1=800$ C. P. S. (constant phase).
4. Frequencies compared by meter 49: 800 C. P. S. (shifting phase) and 800 C. P. S. (constant phase).
5. Audio-frequency signal obtained by interference between frequency $f_2$ from station 2 and frequency $f_3$ from station 3: $w_3=250$ C. P. S. (shifting phase).
6. After frequency multiplication: $nw_3=500$ C. P. S. (shifting phase).
7. Frequency obtained by demodulation of the complex modulated signal $F_3$: (mod.) $nw_3=500$ C. P. S. (constant phase).
8. Frequencies compared by meter 59: 500 C. P. S. (shifting phase) and 500 C. P. S. (constant phase).

As will appear hereinbelow, there are other choices among the components of the complex audio signal from 45, besides those selected for the numerical example above, which may be advantageously used for the phase comparison process. In certain of these cases the signals from filters 47 and 57 may be passed to frequency multipliers 48a and 58a respectively, thence to meters 49 and 59 respectively. In these cases the multiplication factors of 48a and 58a are not the same as those of 48 and 58 respectively. Nor will the multiplication factors of 48 and 58 be necessarily the same as those of 15 and 35 respectively. In any event the components of the complex audio signal must be so selected, and the frequency multipliers so arranged, that the frequencies of the two signals being supplied to meter 49 are alike and that the phase angle indicated by meter 49 is a function of the difference in path lengths between the mobile station 4 and the two fixed stations 1 and 2; also that the frequencies of the two signals being supplied to meter 59 are alike and that the phase angle indicated by meter 59 is a function of the difference in path lengths between the mobile station 4 and the two fixed stations 2 and 3.

In discussing the theory of operation of the present system, it is generally sufficient to consider that portion thereof comprising the central transmitting station 2, one of the lateral transmitting stations, for example, station 1, and one portion of the mobile indicator station 4, for example, that portion comprising the phase meter 49. As stated hereinabove, this portion is sufficient for determining a hyperbolic line of position passing through the point of observation, that is, station 4. Furthermore, since the audio frequencies $w_1$ and $w_3$ are not related in simple harmonic fashion, the operation of this portion of the system will be substantially unaffected by the functioning of the remaining portion of the complete system.

Considering first the case of heterodyne action between two unmodulated transmitters, it may be shown that the alternating current output of a receiver whose detector is a non-linear one of the "square-law" type, after radio-frequency filtering, will be proportional to:

$$2E_1E_2 \cos [2\pi w_1 t - (A_1 - A_2)] \quad (1)$$

wherein:

$E_1$ and $E_2$ are the carrier frequency voltages of stations 1 and 2 respectively, $t$ is time, $$A_1 = \frac{2\pi f_1 s_1}{c}$$

and $$A_2 = \frac{2\pi f_2 s_2}{c} + P$$

$s_1$ and $s_2$ are the distances from the receiving point to transmitters 10 and 20, $c$ is the velocity of propagation of radio waves, and $p$ is the initial phasing between the transmitters of stations 1 and 2.

If the transmitter 10 of station 1 is modulated by a signal of frequency $nw_1$, wherein $n$ is a small integer, the receiver output will be, for the special case where $n=2$, proportional to $$E_1^2 + E_2^2 + \frac{E_1^2 M^2}{2} + E_1 E_2 (M^2 + 4 + 4M \cos g)^{\frac{1}{2}}$$
$$\cos (2\pi w_1 t - h) + 2E_1^2 M \cos (4\pi w_1 t - A_3) +$$
$$E_1 E_2 M \cos [6\pi w_1 t - A_3 - (A_1 - A_2)] +$$
$$\frac{E_1^2 M^2}{2} \cos (8\pi w_1 t - 2A_3) \quad (2)$$

wherein:

M is the degree of modulation having a value between 0 and 1, $g = A_3 - 2(A_1 - A_2)$, $$A_3 = b + \frac{4\pi w_1 s_1}{c}$$

$b$ is the initial phasing of the modulating signal, $$h = \tan^{-1} \frac{M \sin [A_3 - (A_1 - A_2)] + 2 \sin (A_1 - A_2)}{M \cos [A_3 - (A_1 - A_2)] + 2 \cos (A_1 - A_2)}$$

If the receiver output given by Equation (2) is passed through a filter tuned to $w_1$, the filter output is proportional to.

$$E_1 E_2 (M^2 + 4 + 4M \cos g)^{\frac{1}{2}} \cos (2\pi w_1 t - h) \quad (3)$$

If the distance between antenna 12 and antenna 11 is equal to $s_1$, and the distance between antenna 12 and and antenna 21 is equal to $s_2$, then the signal expressed by Equation (2) is available from receiver 13. Then if filter 14 is tuned to frequency $w_1$, its output is given by Equation (3). In order to obtain self-modulation at station 1, the signal expressed by Equation (3) is multiplied or doubled in frequency by the multiplier or doubler 15 and applied by the modulator 16 to the transmitter 10.

Under these conditions of self-modulation it can be shown that the phase angle of the signal expressed by Equation (3) is related to the phase angle of the modulating signal in such a manner that $$b = 2h + \frac{4\pi w_1 s_1}{c} \quad (4)$$

and that Equation (3) can be rewritten $$E_1 E_2 (M + 2) \cos (2\pi w_1 t - h) \quad (5)$$

If the mobile station 4 is at a distance $s_3$ from station 1 and at a distance $s_4$ from station 2, then, except for the distance factors, the detected signal at station 4 is also given by Equation (2). If this detected signal is passed through a filter tuned to frequency $w_1$, then, except for the distance factors, the filter output is given by Equation (3).

It can be shown that the angle G, which for the new distance factors corresponds to the angle $g$ of Equation (2), is given by $$G = b + 2p + \frac{4\pi f_2}{c}(s_4 - s_3) \quad (6)$$

The amplitude of the component of frequency $w_1$ of the detected signal at the mobile station 4 will therefore depend on the value of $(s_4 - s_3)$. If $(s_4 - s_3)$ changes, the amplitude will change periodically between the limits $E_1 E_2 (2 + M)$ and $E_1 E_2 (2 - M)$ over intervals $s_4 - s_3 = L_2/2$, where $L_2$ is the wave length of the frequency $f_2$ transmitted from station 2. The circuits to which this signal is applied must therefore be designed with such constants that their operation is unaffected by the breathing or periodic variation of the signal level.

It may also be shown from the equations given hereinabove that the readings of phase meter 49 are not affected by changes in phasing between transmitting stations 1 and 2 nor by changes in the carrier frequency of station 1, the same being true of the phase meter 59 with regard to the phasing of stations 2 and 3 and the carrier frequency of station 3.

On the other hand, the readings of the phase meter 49 (and also of phase meter 59) are affected by changes of the carrier frequency $f_2$ of station 2, although this effect is very small, as may be seen from the following. It may be shown that this effect is at a maximum when it is equal to:

$$-\frac{2+M}{2-M} \frac{(2s_1 - 2s_2 - 2s_3 + 2s_4)}{c} \quad (7)$$

If the frequency $f_2$ changes by 10 cycles per second and the arrangement of the stations is such that the distance between stations 1 and 2 is 25 kilometers, it may be calculated from the above that the maximum error in phase meter reading is $10^{-3} \times 20\pi$ radians, or about 3.6 degrees. If consideration is given to the area of operation, it will be seen that the error due to this cause is a fractional part of the maximum possible error.

Considering now the effect of changing the position coordinate $(s_4-s_3)$ of the mobile station 4 on the phase meter reading, it may be shown that $$y=\sin^{-1}\frac{4M+(M^2+4)\cos\left[K+\frac{4\pi f_2}{c}(s_4-s_3)\right]}{M^2+4+4M\cos\left[K+\frac{4\pi f_2}{c}(s_4-s_3)\right]} \quad (8)$$

wherein $y$ is the phase meter reading, and $K=b+2p$.

Equation 8 holds for all values of $M$ between 0 and 1. For the particular case $M=0$, the phase meter reading is $$y_1=-\frac{\pi}{2}-K-\frac{4\pi f_2}{c}(s_4-s_3) \quad (9)$$

which indicates a linear relationship between $y_1$ and the value of $(s_4-s_3)$. The loci of positions of constant phase readings will therefore lie on one of a family of hyperbolas whose foci are at stations 1 and 2.

For other values of $M$, there are slight deviations from this linearity. If a hyperbolic grid system is used, the phase meter reading will be in error by an amount depending on the modulation factor, the position within the lane, and the wave length $L_2$. Considering, for simplicity, a case of motion of the mobile station along the base line, it may be shown that, for $M=1$, the peak error will be $L_2/24$ and for $M=0.5$ it will be approximately $L_2/48$. At a point away from the base line, the error will increase due to lane expansion.

It is not practical to apply a correction to the phase meter reading to eliminate this error, since this would require the phase meter to record absolute phase differences at each point, rather than relative phase changes in moving from a point to another. This error may however be rendered negligible by a proper selection of $M$, $L_2$, and other operating factors.

The method so far described involved, first, self-modulation at twice the beat frequency between the carrier frequencies $f_1$ and $f_2$ from stations 1 and 2, and, second, phase comparison between the doubled $w_1$ component obtained by interference and the (mod.) $2w_1$ component obtained by demodulation. It has been seen that some error arose because the angles G of Equation (6), and the angle H of Equation (3), are both non-linear functions of $(s_4-s_3)$.

It may therefore be preferred to apply the method of the present invention by modulating at twice the beat frequency and using a frequency tripler for phase comparison between the second and third harmonics of the complex signal.

It will be seen that the sixth term of Equation (2), containing the value $6\pi_1$, relates to the third voltage harmonic of the interference signal received at station 4. If this voltage is filtered and passed through a frequency doubler, the output will be proportional to:

$$E_1E_2M\cos[12\pi w_1 t-2(A_3^1+A_1^1-A_2^1)] \quad (10)$$

wherein values $A_1^1$, $A_2^1$ and $A_3^1$ correspond, for spacings $s_3$ and $s_4$, to the values $A_1$, $A_2$ and $A_3$ of Equation (2).

If, at the same time, the fifth term of the same equation, containing the value $4\pi w_1$, is also filtered and sent to a frequency multiplier 48a, shown in Fig. 2, which in this case should be a frequency tripler, the output will be a reference (constant phase) voltage proportional to $$2E_1^2M\cos(12\pi w_1 t-3A_3^1) \quad (11)$$

Phase comparison between the two signals will therefore result in a phase reading $$y_2=2m\pi-\frac{4\pi f_2}{c}(s_1-s_2)-\frac{4\pi f_2}{c}(s_4-s_3) \quad (12)$$

wherein $m$ is any integer.

It will be seen that in this case, the phase reading $y_2$ is a linear function of $(s_4-s_3)$. For changes of $(s_4-s_3)$, $y_2$ changes by $2\pi$ over intervals of $(s_4-s_3)=L_2/2$, and the maximum possible error is 1.2 degrees as compared with 3.6 degrees mentioned hereinabove.

A hyperbolic system of even greater inherent precision can be obtained if a different pair of components of the composite signal is used for phase comparison.

Thus, referring again to Equation (2) and quadrupling the frequency of the $6\pi w_1$ component, there is obtained a signal proportional to $$E_1E_2M\cos[24\pi w_1 t-4A_3^1-4(A_1^1-A_2^1)] \quad (13)$$

If the frequency of the $8\pi w_1$ component is tripled, a signal is obtained which is proportional to $$\frac{E_1^2M^2}{c}\cos(24\pi w_1 t-6A_3^1) \quad (14)$$

Phase comparison of these components gives $$y_3=-4m\pi-\frac{8\pi f_2}{c}(s_1-s_2)-\frac{8\pi f_2}{c}(s_4-s_3) \quad (15)$$

It will be seen that the phase reading $y_3$ changes here by $2\pi$ over intervals of $(s_4-s_3)=L_2/4$, so that the inherent precision is twice that of the systems which indicate the values of $y_1$ or $y_2$.

Those components of the composite signal whose amplitudes depend on the product of the two transmitter fields are more desirable for use than the components whose amplitude depends only on the field of one transmitter, since the former are more uniform over the area of operation. When the frequency multiplication $n$ has a value of 2, it may be seen from Equation (2) that only the $2\pi w_1$ and $6\pi w_1$ components have amplitude dependence on $E_1E_2$, but that the former has amplitude breathing and phase distortion, whereby its use involves some drawbacks. To obtain the advantage of a more uniform signal without breathing or distortion, it is possible to use the present system with modulation at three, four or more times the beat frequency, that is with frequency multiplication wherein $n=3$ or $n=4$, etc. Although this calls for a somewhat broader transmission bandwidth, the only modification required of the apparatus used is a suitable change of filters.

If, for example, a frequency multiplication and modulation is used such that $n=3$, Equation (2) becomes:

$$E_1^2+E_2^2+\frac{E_1^2M^2}{2}+2E_1E_2\cos[2\pi w_1 t-(A_1-A_2)]+$$

$$2E_1^2M\cos(6\pi w_1 t-A_3)+\frac{E_1^2M^2}{2}\cos(12\pi w_1 t-2A_3)+$$

$$E_1E_2M\cos[4\pi w_1 t-A_3+(A_1-A_2)]+$$

$$E_1E_2M\cos[8\pi w_1 t-A_3-(A_1-A_2)] \quad (16)$$

Comparing at the mobile station the phases of the doubled $2\pi w_1$ component with the phase of the $4\pi w_1$ component, it may be shown that the phase meter reading will be $$y_4=-\frac{12\pi f_1 s_1}{c}+\frac{6\pi f_2(s_1+s_2)}{c}-\frac{6\pi f_2(s_4-s_3)}{c} \quad (17)$$

Thus, the phase reading $y_4$ varies in such cases periodically over intervals $(s_4-s_3)=L_2/3$. The same in percent accuracy results if the $8\pi w_1$ component is phase-compared with the doubled $4\pi w_1$ component. In the latter case, however, both signal amplitudes are proportional to $E_1E_2M$.

It is obvious from the preceding that other pairs of components can be used for phase-comparison purposes and that the inherent accuracy of the system is increased by using higher values of $n$. It should be kept in mind however that the analysis presented hereinabove dealt only with one half of the system, that invloving transmitting stations 1 and 2, since the other half, that involving stations 2 and 3, functions in exactly the same manner to give the second desired family of hyperbolas. However, even when the audio frequencies $w_1$ and $w_3$ are selected so as not to be harmonically related to each other in simple fashion (such as 400 and 250 cycles) the modulation and the intermodulation components, and their harmonics, of both halves of the system must be considered. With increased value of $n$ and higher frequency multiplication, the required separation of components introduces practical difficulties which limits the maximum value of $n$.

I claim as my invention:

1. In a method of phase-comparison radiolocation, the steps of transmitting three signals on a single radio frequency channel from three fixed stations, the radio frequency of each of said signals differing from the others by a predetermined audio frequency, receiving said signals at the first station and obtaining a first audio frequency at said station by interference between the signals from the first and second stations, applying solely said audio frequency to modulate the signal transmitted by the first station, receiving said signals at the third station and obtaining a second audio frequency at said station by interference between the signals from the second and third stations, applying solely said second audio frequency to modulate the signal transmitted by the third station, receiving the signals from the fixed stations at a mobile station, obtaining a first audio frequency signal by interference between the signals from the first and second stations, obtaining a second audio frequency signal by demodulating the signal from the first station, obtaining a third audio frequency signal by interference between the signals from the second and third stations, obtaining a fourth audio frequency signal by demodulating the signal from the third station, simultaneously comparing the phases of said first and second and the phases of said third and fourth audio frequency signals, and determining the position of the mobile station from said simultaneous phase comparison.

2. In a method of phase-comparison radiolocation, the steps of transmitting three signals on a single radio frequency channel from a central fixed station and two lateral fixed stations each located to one side of said fixed station, each of said signals being transmitted by one of said stations, the radio frequency of each of said signals differing from the others by a predetermined audio frequency, receiving the signals from the central station and one of the lateral stations at said lateral station and obtaining a first audio frequency at said station by interference between said two signals, multiplying said audio frequency, applying solely said multiplied audio frequency to modulate the signal transmitted by said first lateral station, receiving the signals from the central station and the second lateral station at said second lateral station and obtaining a second audio frequency by interference between said last two signals, multiplying said second audio frequency, applying solely said multiplied second audio frequency to modulate the signal transmitted by the second lateral station, receiving the signals from the three fixed stations at a mobile station, obtaining a first audio frequency signal by interference between the signals from the first lateral and the central stations, multiplying said frequency by a factor equal to that used at the first lateral station, obtaining a second audio frequency signal by demodulating the signal from the first lateral station, obtaining a third audio frequency signal by interference between the signals from the central and the second lateral stations, multiplying said frequency by a factor equal to that used at the second lateral station, obtaining a fourth audio frequency signal by demodulating the signal from the second lateral station, simultaneously comparing the phases of said first and second and the phases of said third and fourth audio frequency signals, and determining the position of the mobile station from said simultaneous phase comparisons.

3. In a method of phase comparison radio-location, the steps of transmitting signals on a single radio frequency channel from a first and a second station, said signals differing from each other by an audio frequency, receiving said signals at the first station and obtaining said audio frequency by interference between said two radio frequency signals, multiplying said frequency by a factor having the value of a small integer, applying solely said multiplied audio frequency to modulate the signal transmitted by the first station, receiving said signals at a mobile station, obtaining a first audio frequency signal by interference between said radio frequency signals, selecting a harmonic of said audio frequency signal, obtaining a second audio frequency signal by demodulating the radio frequency signal from the first station, selecting a harmonic of said second audio frequency signal, said second selected harmonic being of an order different from that of the first selected harmonic, multiplying one of said harmonics so as to make its frequency equal to that of the other harmonic, and comparing the phases of said two harmonics.

4. In a method of phase comparison radio-location, the steps of transmitting signals on a single radio frequency channel from a first and a second station, said signals differing from each other by an audio frequency, receiving said radio frequency signals at the first station and obtaining said audio frequency by interference between said two radio frequency signals, multiplying said frequency by a factor having the value of a small integer, applying solely said multiplied audio frequency to modulate the signal transmitted by the first station, receiving said radio-frequency signals at a mobile station, obtaining a first audio frequency signal by interference between said radio-frequency signals, selecting a harmonic of said audio frequency signal, said harmonic being of an order $M$ having the value of a small integer, multiplying said harmonic by a factor $N$ having the value of a small integer, obtaining a second audio frequency signal by demodulating the radio frequency signal from the first station, selecting a harmonic of said second audio frequency signal, said second selected harmonic being of the order of $M_1$, having the value of a small integer, multiplying said harmonic by a factor $N_1$ having the value of a small integer, said factors and said orders of harmonics being so chosen that $NM=N_1M_1$, and comparing the phases of the two selected multiplied harmonics.

5. The method of claim 4 wherein the values of $M$, $N$, $M_1$ and $N_1$ are small integers having a value not less than 1 and not more than four.

References Cited in the file of this patent

UNITED STATES PATENTS

| | | |
|---|---|---|
| Re. 23,050 | Brunner | Nov. 23, 1948 |
| 2,148,267 | Honore | Feb. 21, 1939 |
| 2,198,113 | Holmes | Apr. 23, 1940 |
| 2,408,773 | Goodall | Oct. 8, 1946 |
| 2,470,787 | Nosker | May 24, 1949 |
| 2,513,314 | Hawkins | July 4, 1950 |
| 2,513,317 | Hawkins | July 4, 1950 |
| 2,513,318 | Hawkins | July 4, 1950 |
| 2,513,320 | Hawkins | July 4, 1950 |
| 2,513,321 | Hawkins | July 4, 1950 |
| 2,528,141 | Hastings | Oct. 31, 1950 |
| 2,551,211 | Hawkins | May 1, 1951 |
| 2,611,127 | Palmer | Sept. 16, 1952 |
| 2,652,558 | Hawkins | Sept. 15, 1953 |
| 2,652,559 | Hawkins | Sept. 15, 1953 |